(No Model.) 2 Sheets—Sheet 2.
W. H. DELANO.
MECHANICAL MOVEMENT FOR WINDMILLS, &c.
No. 598,861. Patented Feb. 8, 1898.
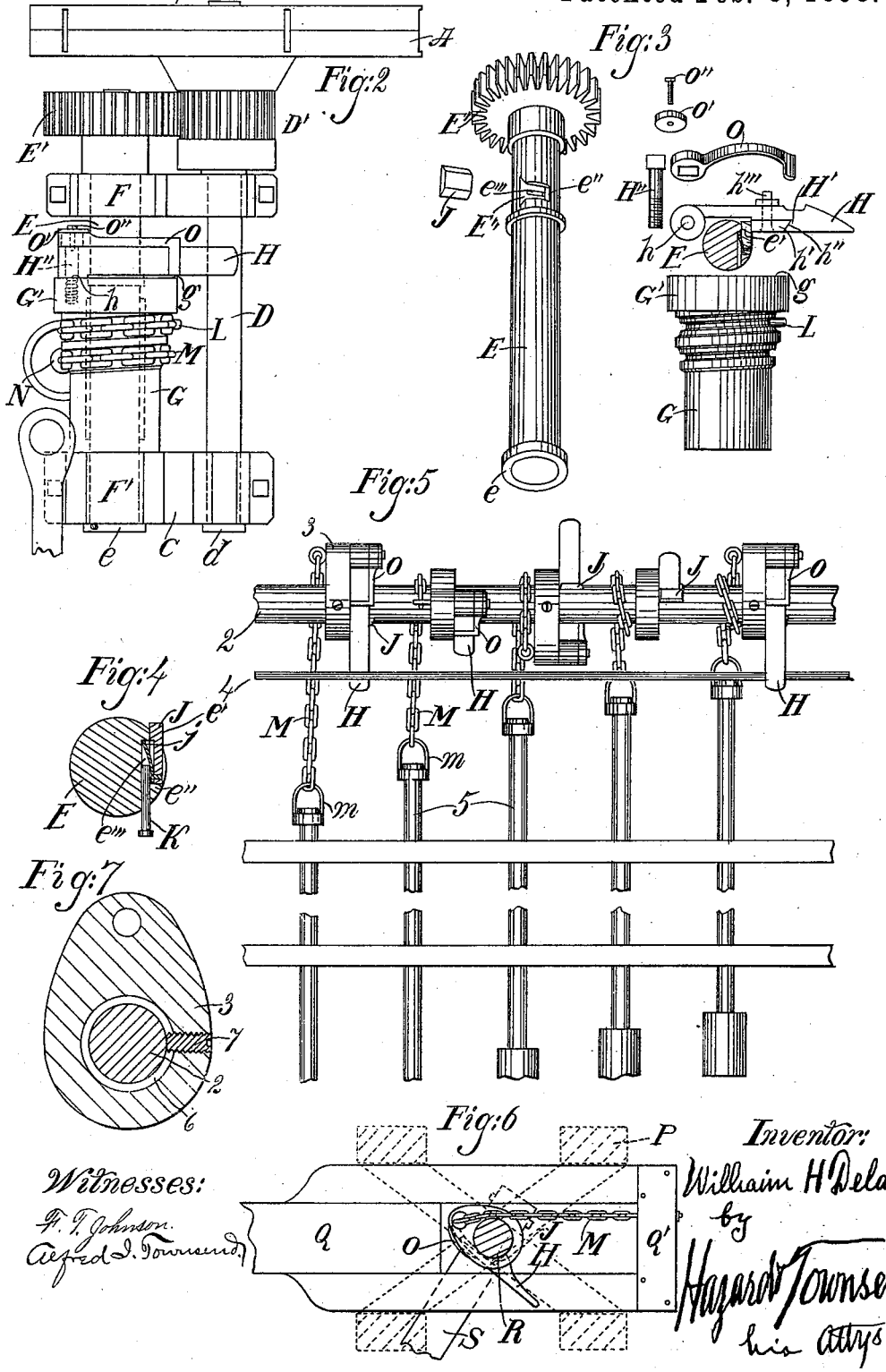

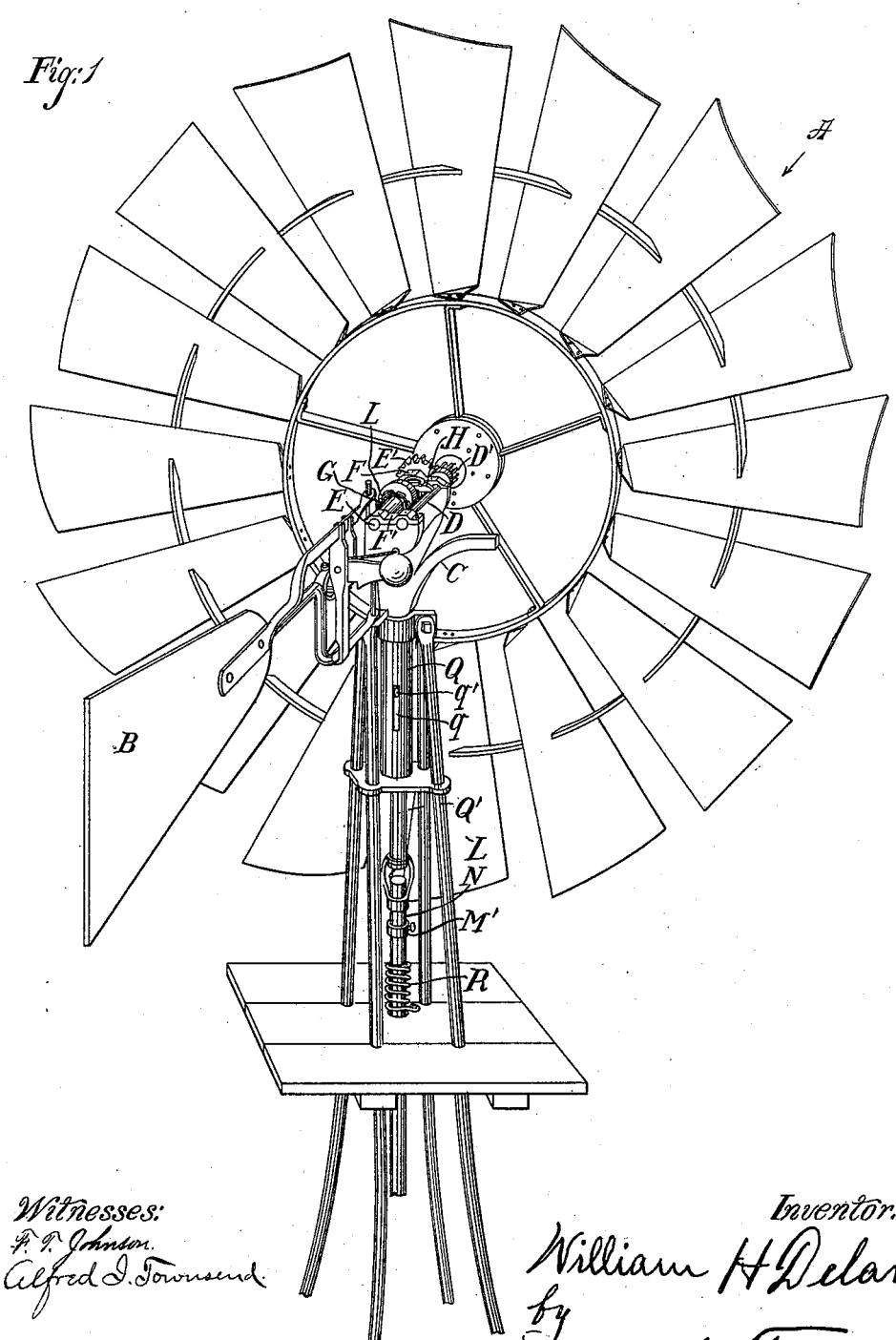

UNITED STATES PATENT OFFICE.

WILLIAM H. DELANO, OF NEWHALL, CALIFORNIA.

MECHANICAL MOVEMENT FOR WINDMILLS, &c.

SPECIFICATION forming part of Letters Patent No. 598,861, dated February 8, 1898.

Application filed April 23, 1896. Serial No. 588,741. (No model.)

*To all whom it may concern:*

Be it known that I, WILLIAM H. DELANO, a citizen of the United States, residing at Newhall, in the county of Los Angeles and State of California, have invented new and useful Improvements in Mechanical Movements for Windmills, &c., of which the following is a specification.

My invention is shown applied to use upon windmills which are used for pumping water, and my invention is especially adapted for this purpose, but is also useful in various other devices, to which I will hereinafter refer.

In all the windmills of this class of which I am aware a crank connection is provided between the pump and the mill, and the pump-rod is both raised and lowered by the operation of the wind-wheel. One great disadvantage of the crank connection is that the excessive weight and strain thus placed upon the crank-bearings causes them to wear rapidly, and in addition to the expense a great deal of lost motion is thereby caused, impairing the effectiveness of the mill. A further disadvantage is that in order to increase the length of the stroke it is necessary to increase the length of the crank, and this diminishes the power of the mill both by reason of the decreased leverage and by reason of the power upon the pump-rod being applied at an angle with its line of motion— that is to say, as the crank rises the end of the crank is thrown to one side of the perpendicular line upon which the pump-rod reciprocates, and the force is thus applied at an angle with the line of motion of the rod, and side strain is placed upon the guides for the piston or pump-rod, thereby causing friction and loss of power. A further objection is that with a crank connection it takes as long to lower the pump-rod as it does to raise it, or, in other words, in a direct-acting mill one-half a revolution of the wind-wheel is absolutely lost, for the reason that the rod will descend of its own weight if it is not retarded by the crank and in much less time than it takes the crank to lower it.

One object of my invention is to produce a mill in which the force will be always applied in a right line with the line of motion of the pump-rod.

A further object of my invention is to provide a windmill in which a long stroke may be secured without decreasing the leverage to any great extent.

A further object of my invention is to provide a mill of the character above specified in which the power will be connected with the pump only while the pump-rod is being raised and will be entirely disconnected therefrom while the pump-rod is being lowered, thereby utilizing the force of gravity to lower the rod and allowing the rod to descend while the wind-wheel is making only about one-quarter of a rotation instead of a full rotation, which is necessary when a mill with crank connection is geared back one-half.

A further object is to provide a new and economical device for changing rotary motion to reciprocating motion and which is applicable to operate pump-rods, stamps in stamp-mills, hay-presses, and in any other place for which it may be adapted.

My invention comprises a rotary shaft provided with a shoulder, a loose collar arranged on the shaft, a clutch attached to the collar, a flexible connection secured at one end to the collar and at the other end to the device to be operated, and suitable means arranged to automatically and intermittently connect and disconnect the clutch with the shaft.

My invention also comprises the peculiar clutch which I provide, whereby I connect and disconnect the collar or drum with the operating-shaft in such a manner that the clutch is not liable to become broken or inoperative from wear and whereby when the parts do become worn they can be renewed at slight expense and labor.

The accompanying drawings illustrate my invention.

Figure 1 is a fragmental perspective plan of a mill embodying my invention. Fig. 2 is an enlarged fragmental view illustrating my improved clutch and drum mechanism. Fig. 3 is a view of the same with the parts separated from each other. Fig. 4 is a cross-section of the shaft and plate, showing the manner of removing the plate from the groove. Fig. 5 is a fragmental view illustrating my invention applied to a stamp-mill. Fig. 6 is a fragmental sectional view looking at the under side of the plunger of a hay-press, showing my invention applied thereto. Fig. 7 is a cross-section of the main shaft of the stamp-mill and one of the collars, showing one mode of securing the collars in place upon the shaft.

In the drawings, A represents the wind-wheel, which is of the usual construction, and B represents the tail thereof.

C is the frame or support, upon which the operative mechanism is arranged.

As shown in the drawings, the wheel A is mounted upon the wheel-shaft D, which is provided with a cog-wheel D', which is arranged to mesh with a larger cog-wheel E', which is provided upon the drum-actuating shaft E, which is journaled in the support C, parallel with the wheel-shaft. The wheel and drum actuating shafts are journaled in boxes F F', as shown, and are retained in place by collars $d$ and $e$, respectively, secured upon the shafts D and E.

Upon the drum-actuating shaft is journaled a sleeve or drum G, which is provided at one end with a flange G'. To the outer face $g$ of this flange is pivoted by one end a clutch-arm H, which has its other end provided with a lug or hook H', which is arranged practically on the other side of the sleeve from the pivot-point $h$ of the arm. Upon the drum-actuating shaft E is provided a shoulder $e'$, upon which this lug or hook H', provided upon the clutch-arm, is arranged to catch. The clutch-arm projects beyond this lug or hook H' and is arranged to engage with a suitable stop, such as the wheel-shaft D, and to be thereby lifted from its engagement with the shoulder $e'$ upon the drum-rotating shaft, whereby the drum is free to rotate upon the shaft until the arm again hooks upon the shoulder. The effect of this arrangement is that the clutch-arm hooks upon the drum-rotating shaft, and the power is applied upon the sleeve or drum near its periphery. The strain is also thus brought to bear upon the shaft in such a manner that the strain is toward the shaft instead of away from it, as in the ordinary ratchet arrangement, and the shaft supports the strain, and I am thereby enabled to make this shoulder $e'$ of a separate piece (the plate J) of very hard metal and to so arrange it that it may be removed when worn and a new piece substituted therefor. This is done by providing the shaft at one side with a dovetail groove E'' and a hardened-steel plate J, arranged to fit in such groove with one end of the plate projecting beyond the periphery of the shaft to form a shoulder $e'$. This groove E'' is not cut entirely across the shaft, but a shoulder $e''$ is left at the lower end thereof to hold the plate J in position. In order to provide means whereby the plate J may be rigidly held in position in the slot, but may be readily disengaged and removed therefrom when desired, I provide a channel $e'''$, passing through the shoulder $e''$ and along the bottom of the groove E''. To the inner face of the plate J is secured a spring $j$, the upper end of which is free and arranged to spring inward away from the plate. This spring is of such length that when the plate is fully seated in the groove E'' the spring enters the channel $e'''$ and engages with the end wall thereof, thus holding the plate in position in the groove. To release the spring from its engagement, a pin K (shown in Fig. 5) is inserted in the channel, and as it is forced inward along the channel it forces the spring outward against the plate, thus freeing the spring from its engagement with the wall of the channel and allowing the plate J to be removed therefrom. The clutch-arm H is also provided with a removable piece of hardened steel $h'$, which is held in place by resting against a shoulder $h''$, provided upon the arm, and by means of a bolt $h'''$, passing through the piece $h'$ and through the clutch-arm.

A suitable flexible connection, such as the chain M, is secured to the drum by means of a hook L, which is secured to the drum, and when the drum is rotated this chain is wound thereupon, and the other end being attached to the pump-rod N such pump-rod is raised in a direct right line upward, thus avoiding all friction and consequent loss of power.

It is necessary for the carrying out of my invention that the pump-rod be of the water-lifting type, which lifts water with its up-stroke and which is capable of a rapid down-stroke in which it raises no water, so that as soon as the wind-wheel has lifted the rod to the upward limit of its stroke the rod can immediately fall, so that only a very small proportion of the revolution of the wheel is accomplished while the pump-rod is moving downward. Were the rod to be of any type which did not act quickly to regain the starting-point from which the lifting is done, the main object of my invention would not be accomplished, for in that case the wind-wheel would make waste revolutions.

In practice the windmill is set in operation, thus rotating the wheel-shaft and the drum-operating shaft, and as the shoulder $e'$ upon the drum-operating shaft is carried around it engages with the lug or hook H' of the clutch-arm H and causes such clutch-arm and the drum to rotate with the shaft. As soon as the clutch-arm reaches the wheel-shaft it engages therewith, and further rotation of the drum-operating shaft causes the clutch-arm to be raised from its engagement with the shoulder $e'$ and the weight of the pump-rod operating upon the chain causes the drum to rotate backward about three-quarters of a rotation until it resumes its normal position. By the time the drum has returned to its normal position the shoulder $e'$ has again reached the point where it engages with the lug or hook H', and again its rotation carries the drum around until the clutch is released from its engagement. By this means the pump-rod is free to descend as rapidly as the force of gravity will carry it back, and the downstroke may be made in very little time compared with what is necessary when the pump-rod is connected with the crank. It is of course desirable that the pump-rod be of sufficient weight to cause it to descend with such rapidity as to carry it back to its normal position before the clutch-arm is again engaged by the shoulder $e'$ upon the shaft.

O is a spring which is arranged to force the clutch-arm H against the shaft. The spring is arranged to fit upon the square head of the bolt H'', which pivots the clutch-arm H to the drum G, and a washer O' and screw O'' hold it in place thereon. In Fig. 3 the shaft E is shown in cross-section beneath the clutch-arm H in order to more clearly illustrate the position of the parts. In Figs. 1, 2, and 3 the parts are shown in the position they assume just as the clutch is being tripped to release it from the shoulder $e'$.

The mill is arranged with the customary sliding connection used in windmills, comprising the outer tube Q, provided with the slot $q$, and the inner tube Q', arranged to slide inside of the outer tube and provided with the stud $q'$, arranged to slide up and down in the slot as the pump-rod is reciprocated. The lower end of the tube Q' is connected by means of the ordinary swivel connection with the pump-rod N, and the upper end is attached to the chain M. The stud $q'$, engaging with the walls of the slot $q$, prevents the tube Q' from turning with relation to the tube Q, and thus prevents the chain L from twisting.

A spiral spring R is arranged encircling the pump-rod and is engaged by the collar M', arranged upon the pump-rod, so that when the pump-rod is released from its engagement with the drum and descends it will compress the spring R, and the elasticity of the spring will start the pump-rod on its upward motion, thus to relieve the clutch from the excessive strain which would be present were the entire weight of the rod thrown abruptly upon the clutch.

In Figs. 5 and 7 I have shown how my invention may be applied to a stamp-mill. In these views, 2 represents the main shaft, upon which I secure the collars 3, which correspond to the drum G. (Shown in Figs. 1, 2, and 3.) To these collars the chain M is secured and winds directly upon the main shaft 2. The clutch mechanism is the same as that shown in Figs. 1, 2, and 3, and a rod 4 is arranged to take the place of the shaft D to disengage the clutches from their engagement with the shaft. 5 represents the stems of the stamps. In Fig. 7 I show one way of securing the collars in place upon the shaft. This means consists of a groove 6, cut in the shaft, and a set-screw 7, arranged screwed through the collar and projecting into the groove. This allows the shaft to turn inside the collar and yet prevents the collar from becoming displaced upon the shaft. Any other means may be employed for securing the collars in place upon the shaft without departing from the spirit of my invention.

The chains M are secured to the stamp-stems 5 by swivels $m$, so that if deemed necessary means may be arranged to rotate the stamps to cause them to wear evenly. This, however, is foreign to my present invention and is not illustrated herein.

In Fig. 6 I have shown means whereby my invention may be applied to a hay-press. In this view I have shown in dotted lines a supporting-frame P, sectioned below the plunger Q of the press, and the view is taken looking at the bottom of the plunger. A shaft R is journaled in the frame P and projects above such frame and has upon its upper end a lever S, rigidly fixed thereto. The clutch is arranged to engage the shaft in the manner hereinbefore described, and the chain M is secured to a cross-bar Q' of the plunger, so that when the shaft is rotated the clutch engages with the shaft and causes the chain to wind upon the shaft and to operate the plunger in the usual manner. Any suitable means for returning the plunger may be provided, such as a spring; but I have not illustrated any means for this purpose, for the reason that such feature will be readily understood by those versed in the art and is not claimed herein as an essential part of my invention. Thus when the lever S is operated to rotate the shaft continuously the clutch intermittently connects and disconnects the collar with the shaft and causes the chain to wind the shaft and intermittently operate the plunger.

My invention may be adapted for use in many other devices which it is needless for me to specify herein. It is adapted for use in many machines in which it is necessary to convert constant rotary motion into reciprocating motion.

Now, having described my invention, what I claim as new, and desire to secure by Letters Patent, is—

1. The combination set forth of a rotatable shaft provided with a shoulder; a drum or collar journaled on the shaft; a clutch-arm pivoted to one side of the drum and provided near the other side of the drum with a lug or hook arranged to engage the shoulder upon the shaft; means for disengaging the clutch from the shaft; and means for communicating power from the drum to the device to be operated.

2. The combination of a rotatable shaft provided with a shoulder; a drum or collar journaled to revolve; a clutch pivoted to one side of the drum, extending across the shaft and provided near the other side of the drum with a lug or shoulder to engage the shoulder on the shaft; and means arranged to intermittently disengage the clutch from the shaft.

3. The combination set forth of the rotatable shaft provided with the shoulder; the drum journaled on the shaft; the clutch-arm pivoted by one end to one side of the drum and having its other end provided near the other side of the drum with a lug or hook arranged to engage the shoulder upon the shaft; suitable means for disengaging the clutch-arm from the shoulder at each revolution of the shaft, and a suitable flexible device arranged to connect the drum with the device to be operated.

4. The combination set forth of the shaft provided with the transversely-arranged dovetail groove; the dovetail plate of hard metal arranged to fit in such groove and to project beyond the periphery of the shaft; and the clutch-arm arranged to hook upon such projecting end of the plate.

5. The combination set forth of the shaft provided with the transversely-arranged dovetail groove having at its lower end a shoulder, such shaft being also provided with a channel-opening passing through the shoulder and extending partially along the bottom of the groove; and the dovetail plate arranged to fit in the groove and provided on its inner face with the spring attached to the plate by one end and having its other end arranged to spring into the channel and to engage with the end wall thereof when the plate is fully seated in the groove.

WILLIAM H. DELANO.

Witnesses:
F. DELANO,
EDW. D. KICHLINE.